UNITED STATES PATENT OFFICE.

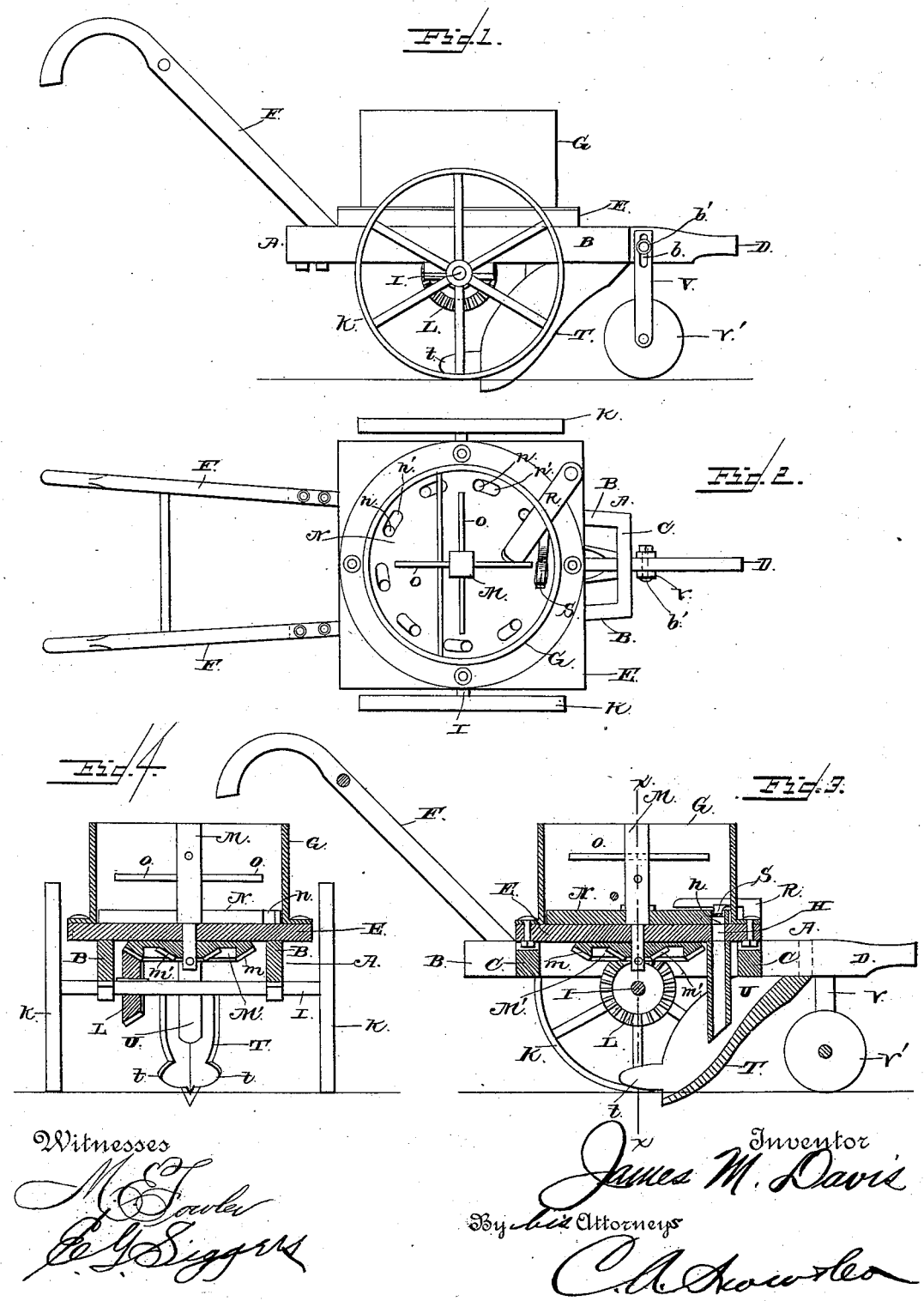

JAMES MONROE DAVIS, OF PRAIRIE GROVE, ARKANSAS, ASSIGNOR OF ONE-HALF TO GEORGE E. JAMES, OF SAME PLACE.

PLANTER.

SPECIFICATION forming part of Letters Patent No. 359,669, dated March 22, 1887.

Application filed September 6, 1886. Serial No. 212,838. (No model.)

*To all whom it may concern:*

Be it known that I, JAMES MONROE DAVIS, a citizen of the United States, residing at Prairie Grove, in the county of Washington and State of Arkansas, have invented a new and useful Improvement in Planters, of which the following is a specification.

My invention relates to an improvement in planters; and it consists in the peculiar construction and combination of devices, that will be more fully set forth hereinafter, and particularly pointed out in the claim.

In the drawings, Figure 1 is a side elevation of a planter embodying my improvements. Fig. 2 is a top plan view of the same. Fig. 3 is a vertical longitudinal sectional view. Fig. 4 is a transverse sectional view taken on the line *x x* of Fig. 3.

A represents the frame of the planter, which comprises the longitudinal diverging beams B, the cross-beams C, connecting the front and rear ends of the said beams, and the central longitudinal forwardly-projecting beam, D, which is attached to the cross-bars at the front end of the frame.

E represents a horizontal platform, which is secured on the upper side of the frame, and F represents the usual handles, which are attached to the rear end of the frame. The platform E forms the bottom for a vertical cylindrical hopper, G, and in the said platform, at the front side of the hopper, is an elongated opening, H, forming the discharge-opening for the hopper.

I represents a transverse shaft, which is journaled to the under side of the frame, near the center thereof. To the ends of the said shaft are attached wheels K, and near the center of the shaft is a gear-wheel, L, which is splined on the shaft and movable thereon.

M represents a vertical shaft, which extends through an opening made in the center of the platform E. The upper end of the said shaft projects upwardly in the center of the hopper, and is squared, and the lower end of the shaft depends from the bottom of the hopper, and is provided with a gear-wheel, M', having two series of gear-teeth, *m* and *m'*, arranged concentrically.

From the foregoing description it will be readily understood that the gear-wheel L may be moved on the shaft I and caused to engage with either the teeth *m* or the teeth *m'* of the wheel M'.

N represents a seed-disk, which is circular, and is located in the bottom of the hopper. The said seed-disk is provided with a square central opening, into which the upper portion of the shaft M extends, thereby locking the seed-disk to the shaft M, and causing it to rotate therewith. The upper portion of the shaft M is provided with radial stirring-arms O, which are adapted to sweep around in the hopper and agitate the seeds therein, and prevent them from becoming clogged. Near the periphery of the disk is made a series of seed cups or openings, *n*. Each of the said cups or openings is round on one side, and is provided on the other side with an inclined conducting-groove, *n'*.

On one corner of the platform E is secured a cut-off arm, R, which extends through an opening that is made in one side of the hopper, and projects over the upper side of the seed-disk, as shown. The function of this cut-off arm is to scrape the upper side of the disk N and remove the superfluous superincumbent seeds from the seed-cups.

S represents a spring, which extends from one side of the cut-off arm, and bears upon the upper side of the seed-disk, near the outer edge thereof, and is adapted to enter the seed-cups as they are successively presented to it by the rotation of the disk, and thus force the seeds in the seed-cups through the opening H in the bottom of the hopper as the seed-cups successively register with the said openings. The curved outer end of the said spring S bears against the inclined groove *n'* of each of the seed-cups as the seed-disk is rotated, and the said inclined grooves cause the said spring to be readily disengaged from each cup before the other reaches the spring.

To the under side of the frame A, near the front end thereof, is secured a rearwardly and downwardly extending furrow-opener, T, which is made of sheet or plate metal and is substantially V-shaped in cross-section. The said furrow-opener is provided at its rear end with rearwardly and outwardly extending wings t.

U represents a funnel or spout, which extends from the opening H of the bottom of the hopper to the furrow-opener, and is adapted to discharge the seed from the hopper into the furrow made by the furrow-opener, as will be readily understood.

To the forwardly-extending beam B is attached a vertical depending frame, V, which carries a gage-wheel, V'. The vertical arms of the frame are provided with vertical slots b, through which passes the transverse clamping-bolt b', that extends through the beam D. By means of the said bolt the frame is securely held to the beam, and by reason of the slots b the said frame may be adjusted vertically on the said beam, and thereby raise or lower the gage-wheel.

The operation of my invention is as follows: The seeds to be planted are placed in the hopper, and the machine is drawn across the field by a horse or other draft-animal. The rotation of the wheels K is communicated to the seed-disk, causing the latter to revolve and discharge the seeds into the furrow by the mechanism before described. By moving the wheel L, so as to cause the teeth m of the wheel M' to become engaged therewith, the seed-disk will be revolved at a higher rate of speed than if the wheel L is caused to engage the teeth m', and consequently the hills may be planted more closely together in the rows.

Having thus described my invention, I claim—

In a corn-planter, the combination of the hopper having the discharge-opening in its bottom, the seed-disk rotating in the hopper, and having the seed-cups n, provided each with an inclined groove, n', on one side, the cut-off arm, and the spring S, bearing on the seed-disk and adapted to enter each seed-cup successively as the latter registers with the discharge-opening, to force the seeds through the discharge-opening, substantially as described.

In testimony that I claim the foregoing as my own I have hereto affixed my signature in presence of two witnesses.

JAMES MONROE DAVIS.

Witnesses:
E. G. McCORMICK,
W. F. GREENE.